US008909165B2

(12) United States Patent
Hendin

(10) Patent No.: US 8,909,165 B2
(45) Date of Patent: Dec. 9, 2014

(54) ISOLATION TECHNIQUES FOR MULTIPLE CO-LOCATED RADIO MODULES

(75) Inventor: Neil Hendin, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1010 days.

(21) Appl. No.: 12/546,425

(22) Filed: Aug. 24, 2009

(65) Prior Publication Data

US 2010/0227570 A1 Sep. 9, 2010

Related U.S. Application Data

(63) Continuation-in-part of application No. 12/400,702, filed on Mar. 9, 2009.

(51) Int. Cl.
| | | |
|---|---|---|
| H04B 1/44 | (2006.01) | |
| H04B 1/52 | (2006.01) | |
| H04B 1/00 | (2006.01) | |
| H04B 1/40 | (2006.01) | |
| H04W 88/06 | (2009.01) | |

(52) U.S. Cl.
CPC ........... *H04B 1/006* (2013.01); *H04M 2250/06* (2013.01); *H04W 88/06* (2013.01); *H04B 1/525* (2013.01); *H04M 2250/02* (2013.01); *H04B 1/406* (2013.01)
USPC ...... 455/78; 455/234.1; 455/232.1; 455/63.4; 455/60.3; 455/575.1; 455/82; 455/62; 455/226.1; 455/550; 455/88; 455/63.1

(58) Field of Classification Search
USPC ......... 455/63, 234.1, 232.1, 63.1, 226.1, 295, 455/3.01, 67.3, 67.16, 90.3, 575.1, 82, 62, 455/78; 370/335, 342, 252
See application file for complete search history.

(56) References Cited

U.S. PATENT DOCUMENTS

| | | |
|---|---|---|
| 5,361,401 A | 11/1994 | Pirillo |
| 5,491,472 A | 2/1996 | Kurtz |
| 5,499,243 A | 3/1996 | Hall |
| 5,515,369 A | 5/1996 | Flammer, III et al. |

(Continued)

FOREIGN PATENT DOCUMENTS

| | | |
|---|---|---|
| CN | 1270462 A | 10/2000 |
| CN | 1930793 A | 3/2007 |

(Continued)

OTHER PUBLICATIONS 802.15.2 (TM), Part 15.2 Coexistence of Wireless Personal Area Networks with Other Wireless Devices Operating in Unlicensed Frequency Bands, IEEE Computer Society, New York, NY, Aug. 28, 2003.

(Continued)

*Primary Examiner* — Ganiyu A Hanidu
(74) *Attorney, Agent, or Firm* — Mahamedi Paradice LLP

(57) ABSTRACT

Isolation techniques for multiple co-located radio modules are disclosed. For example, an apparatus may include an antenna, a first transceiver to communicate wirelessly across a first link, a second transceiver to communicate wirelessly across a second link, a shared antenna structure operative to allow the first transceiver and the second transceiver to share the antenna for simultaneous operations, and an active signal canceller operative to generate a cancellation signal to cancel an interference signal for a radio-frequency coupling channel between the first and second transceivers. Other embodiments are disclosed and claimed.

19 Claims, 9 Drawing Sheets

(56) References Cited

U.S. PATENT DOCUMENTS

| | | | |
|---|---|---|---|
| 5,826,181 A | 10/1998 | Reed | |
| 6,018,644 A * | 1/2000 | Minarik | 455/82 |
| 6,032,026 A * | 2/2000 | Seki et al. | 455/63.1 |
| 6,081,720 A | 6/2000 | Sampson | |
| 6,128,479 A | 10/2000 | Fitzpatrick et al. | |
| 6,272,322 B1 | 8/2001 | Su | |
| 6,317,436 B1 | 11/2001 | Young et al. | |
| 6,326,926 B1 | 12/2001 | Shoobridge et al. | |
| 6,392,487 B1 * | 5/2002 | Alexanian | 330/254 |
| 6,539,204 B1 * | 3/2003 | Marsh et al. | 455/63.1 |
| 6,560,443 B1 | 5/2003 | Vaisanen et al. | |
| 6,574,206 B2 | 6/2003 | Young | |
| 6,584,090 B1 | 6/2003 | Abdelgany et al. | |
| 6,643,522 B1 | 11/2003 | Young | |
| 6,646,505 B2 | 11/2003 | Anderson et al. | |
| 6,704,346 B1 | 3/2004 | Mansfield | |
| 6,771,966 B1 | 8/2004 | Chow | |
| 6,842,607 B2 | 1/2005 | Godfrey et al. | |
| 7,046,649 B2 | 5/2006 | Awater et al. | |
| 7,142,884 B2 * | 11/2006 | Hagn | 455/552.1 |
| 7,167,722 B2 | 1/2007 | Chiu et al. | |
| 7,177,645 B2 | 2/2007 | Goldhamer | |
| 7,180,884 B2 | 2/2007 | Elliott et al. | |
| 7,233,602 B2 | 6/2007 | Chen et al. | |
| 7,242,294 B2 | 7/2007 | Warrior et al. | |
| 7,248,657 B2 * | 7/2007 | Aromaa et al. | 375/346 |
| 7,251,459 B2 | 7/2007 | McFarland et al. | |
| 7,324,793 B2 | 1/2008 | Lee et al. | |
| 7,369,092 B1 * | 5/2008 | Wen et al. | 343/702 |
| 7,406,296 B2 * | 7/2008 | Haartsen | 455/41.2 |
| 7,447,519 B2 | 11/2008 | Axness et al. | |
| 7,468,963 B2 | 12/2008 | Capretta | |
| 7,489,903 B2 | 2/2009 | Johansson et al. | |
| 7,577,091 B2 | 8/2009 | Antal et al. | |
| 7,580,386 B2 | 8/2009 | Oliver | |
| 7,636,336 B2 | 12/2009 | Forte et al. | |
| 7,664,455 B2 * | 2/2010 | So et al. | 455/3.01 |
| 7,710,927 B2 | 5/2010 | Ozluturk | |
| 7,720,779 B1 | 5/2010 | Perry et al. | |
| 7,778,226 B2 | 8/2010 | Rayzman et al. | |
| 7,920,883 B2 | 4/2011 | Tu | |
| 7,971,253 B1 | 6/2011 | Gupta | |
| 8,064,537 B2 | 11/2011 | Xu et al. | |
| 8,185,165 B2 | 5/2012 | Beninghaus et al. | |
| 8,249,527 B2 | 8/2012 | Rybicki | |
| 8,260,214 B2 | 9/2012 | Marlett et al. | |
| 8,265,563 B2 | 9/2012 | Beninghaus et al. | |
| 8,284,721 B2 | 10/2012 | Chen et al. | |
| 8,498,574 B2 | 7/2013 | Beninghaus et al. | |
| 8,583,057 B2 | 11/2013 | Tu et al. | |
| 2001/0005685 A1 | 6/2001 | Nishimori et al. | |
| 2002/0068588 A1 | 6/2002 | Yoshida et al. | |
| 2002/0077154 A1 | 6/2002 | Judson et al. | |
| 2002/0086644 A1 * | 7/2002 | Koskinen | 455/88 |
| 2002/0090974 A1 | 7/2002 | Hagn | |
| 2002/0136184 A1 | 9/2002 | Liang et al. | |
| 2002/0136233 A1 | 9/2002 | Chen et al. | |
| 2002/0142725 A1 * | 10/2002 | Clelland et al. | 455/63 |
| 2003/0014682 A1 | 1/2003 | Schmidt | |
| 2003/0055735 A1 | 3/2003 | Cameron et al. | |
| 2003/0189935 A1 | 10/2003 | Warden et al. | |
| 2004/0028003 A1 | 2/2004 | Diener et al. | |
| 2004/0141522 A1 | 7/2004 | Texerman et al. | |
| 2004/0185856 A1 | 9/2004 | McKenna et al. | |
| 2004/0218563 A1 | 11/2004 | Porter et al. | |
| 2005/0003855 A1 | 1/2005 | Wada et al. | |
| 2005/0025164 A1 | 2/2005 | Kavanagh et al. | |
| 2005/0030924 A1 | 2/2005 | Yano et al. | |
| 2005/0149628 A1 | 7/2005 | Mazzola et al. | |
| 2005/0170776 A1 | 8/2005 | Siorpaes et al. | |
| 2005/0226616 A1 | 10/2005 | Davidson | |
| 2005/0227631 A1 | 10/2005 | Robinett | |
| 2006/0099981 A1 | 5/2006 | McKenna et al. | |
| 2006/0104232 A1 | 5/2006 | Gidwani | |
| 2006/0111042 A1 | 5/2006 | Pitchers | |
| 2006/0121916 A1 | 6/2006 | Aborn et al. | |
| 2006/0153284 A1 | 7/2006 | Souissi et al. | |
| 2006/0194538 A1 | 8/2006 | Palin et al. | |
| 2006/0268785 A1 | 11/2006 | Park et al. | |
| 2006/0292986 A1 | 12/2006 | Bitran et al. | |
| 2007/0060055 A1 | 3/2007 | Desai et al. | |
| 2007/0115905 A1 | 5/2007 | Jokela et al. | |
| 2007/0129104 A1 | 6/2007 | Sano et al. | |
| 2007/0149123 A1 | 6/2007 | Palin | |
| 2007/0238483 A1 | 10/2007 | Boireau et al. | |
| 2007/0281760 A1 | 12/2007 | Nikitin et al. | |
| 2007/0293224 A1 | 12/2007 | Wang et al. | |
| 2008/0102885 A1 | 5/2008 | Tu et al. | |
| 2008/0107071 A1 | 5/2008 | Tsigler et al. | |
| 2008/0139125 A1 | 6/2008 | Son et al. | |
| 2008/0144493 A1 | 6/2008 | Yeh | |
| 2008/0219377 A1 * | 9/2008 | Nisbet | 375/296 |
| 2008/0253345 A1 | 10/2008 | Sanquinetti | |
| 2008/0253386 A1 | 10/2008 | Barum | |
| 2008/0260000 A1 | 10/2008 | Periyalwar et al. | |
| 2008/0310350 A1 | 12/2008 | Dykema et al. | |
| 2009/0003252 A1 | 1/2009 | Salomone et al. | |
| 2009/0022078 A1 | 1/2009 | Patterson et al. | |
| 2009/0059827 A1 | 3/2009 | Liu et al. | |
| 2009/0088089 A1 | 4/2009 | Chandra et al. | |
| 2009/0181466 A1 * | 7/2009 | Wenzel et al. | 436/163 |
| 2009/0243873 A1 | 10/2009 | Mizukawa et al. | |
| 2009/0274158 A1 | 11/2009 | Sharp et al. | |
| 2010/0150027 A1 | 6/2010 | Atwal et al. | |
| 2010/0277308 A1 | 11/2010 | Potkonjak | |
| 2011/0085494 A1 | 4/2011 | Ji et al. | |
| 2011/0099126 A1 | 4/2011 | Belani et al. | |
| 2011/0153805 A1 | 6/2011 | Beninghaus et al. | |
| 2011/0263214 A1 | 10/2011 | Robinson et al. | |

FOREIGN PATENT DOCUMENTS

| | | |
|---|---|---|
| CN | 1946199 A | 4/2007 |
| CN | 101044778 A | 9/2007 |
| CN | 101464722 A | 6/2009 |
| EP | 1225785 A1 | 7/2002 |
| EP | 1914835 A1 | 4/2008 |
| KR | 20030058897 A | 7/2003 |
| KR | 1020080046423 | 5/2008 |
| WO | WO-2005086379 A1 | 9/2005 |
| WO | WO-2005107064 A1 | 11/2005 |
| WO | WO-2005125024 A2 | 12/2005 |
| WO | 2006059294 | 6/2006 |
| WO | 2007118126 | 10/2007 |
| WO | 2008055227 A3 | 5/2008 |
| WO | 2008102885 A2 | 5/2008 |
| WO | WO-2009022709 A1 | 2/2009 |
| WO | WO-2010141383 A2 | 12/2010 |
| WO | WO-2011075632 A2 | 6/2011 |

OTHER PUBLICATIONS

Non-Final Office Action Mailed Apr. 2, 2010, U.S. Appl. No. 12/400,702, 16 pages.

Non-Final Office Action Mailed Apr. 30, 2010, U.S. Appl. No. 11/555,255, 12 pages.

International Search Report and Written Opinion, Mailed Sep. 30, 2010, Application No. PCT/US2010/026466.

International Search Report and Written Opinion for PCT Patent Application No. PCT/US2011/055085, mailed Feb. 28, 2012, 8 pgs.

International Application No. PCT/US2010/045787, International Search Report and Written Opinion mailed on Apr. 22, 2011, 6 pages.

* cited by examiner

ISOLATION TECHNIQUES FOR MULTIPLE CO-LOCATED RADIO MODULES

RELATED APPLICATIONS

This application is a continuation-in-part, and claims priority to, the commonly-owned co-pending patent application U.S. Ser. No. 12/400,702, entitled "Shared Antenna Architecture For Multiple Co-Located Radio Modules," filed Mar. 9, 2009, which is incorporated herein by reference in its entirety.

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and audio) reception. Exemplary wireless communications technologies include cellular, satellite, and mobile data networking technologies.

Some mobile computing devices may include multiple radios to handle different wireless technologies, such as various cellular radio standards, Institute of Electrical and Electronics Engineers (IEEE) 802.11 (Wi-Fi), IEEE 802.16 (WiMAX), Bluetooth, Global Positioning System (GPS), Digital Video Broadcasting-Handheld (DVB-H), and many others. Simultaneous operations for multiple radios may create mutual interference between the radios. This may be particularly problematic for smaller form-factor devices, such as mobile computing devices, due to the close proximity of the radios. As a result, performance degradation may occur. This degradation can impair or even prevent the device performing various communications applications.

DETAILED DESCRIPTION

Figure 1:
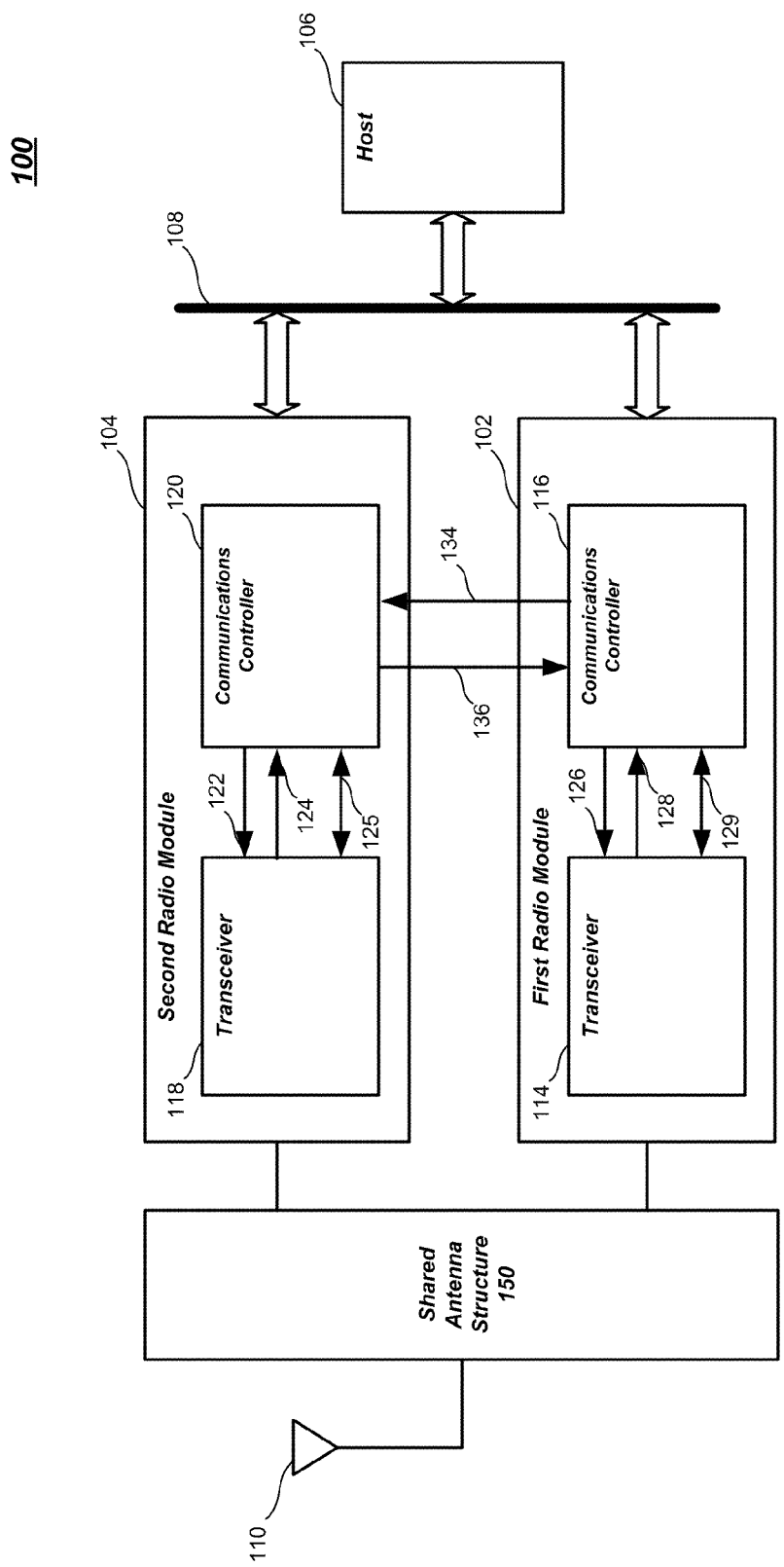
FIG. 1 illustrates one embodiment of a first apparatus.

Various embodiments are generally directed to internal antenna and transceiver designs that may improve the performance of a mobile computing device by improving one or more of characteristics, such as a size, shape, form factor, power consumption, battery life, transceiver operations, signal quality, weight, and other characteristics of the mobile computing device. For example, various embodiments may reduce frequency coexistence interference and mutual coupling within a mobile computing device resulting in improved performance such as lower occurrences of transceiver blocking, less voice noise, and increased data rates. In various implementations, the described embodiments may provide flexibility for low-profile, small and compact device designs. Accordingly, a user may realize enhanced products and services.

Various embodiments may be directed to techniques for improving isolation of multiple radios within a single device. More particularly, various embodiments may be directed to techniques for performing active signal cancellation between multiple radios to address frequency coexistence interference and mutual coupling generated during simultaneous operations of the multiple radios. This may be particularly useful, for example, when multiple radios share a single antenna or antenna array. These radios may be within a single device, such as a mobile computing device, for example. Thus, such radios are also referred to as co-located radios.

Active signal cancellation may enhance simultaneous operations of multiple co-located radios implemented within a single device. A design challenge presents itself when multiple co-located radios are simultaneous operating. In particular, it becomes increasingly expensive to ensure proper isolation between radios. For instance, a transmitting radio may create undesirable radio-frequency (RF) noise, electromagnetic interference (EMI), cross-talk, and other noise or interference signals that may affect sensitivity and performance of a receiving radio. This is due in part to the closer proximity of multiple co-located radios within smaller form factors typically found in a mobile computing device. Such noise and interference may also be created when using a shared antenna structure for the co-located radios. For instance, a shared antenna structure may implement components that facilitate creation of an RF coupling channel between radios, such as splitters, combiners, switches, and so forth. At the same time, recent innovations in radio services, features and higher data rates increases receiver susceptibility to noise and other interference signals. Therefore, reducing or cancelling undesirable interference signals between co-located radios may assist in improving receiver sensitivity for one or more of the radios. Consequently, reducing or cancelling such interference signals may improve simultaneous operations for multiple co-located radios, and as such becomes an increasingly important design factor for mobile computing devices.

The shared antenna structure may be arranged to allow simultaneous or mutually-exclusive use of the antenna by the two or more wireless transceivers. This provides the advantage of reducing a number of antennas implemented on a single device, particularly those with a smaller form factor, such as a mobile computing device. Furthermore, the shared antenna structure may efficiently use power provided to a mobile computing device, thereby extending battery life for the mobile computing device. As a result, a mobile computing device may be smaller, lighter and operate longer than conventional devices.

The shared antenna structure may use an innovative combination of circuit elements, such as combiners and switches, to enhance co-existence and reduce insertion loss when operating in one or both modes. For instance, when operating in one mode, the shared antenna structure may avoid the use of circuit elements used to provide the other mode, and vice-versa. This potentially avoids inefficiencies associated with the circuit elements used to provide either mode. For example, when operating in a mutually-exclusive mode, the shared antenna structure may avoid the use of one or more combiners used to provide a simultaneous mode. This reduces insertion loss associated with the combiners when the shared antenna structure is used by a single transceiver. In some cases, the insertion loss may be significant, on the order of 3.5 to 4 dB or more. The insertion loss potentially reduces the range and operational performance of the co-located radios. Consequently, reduced insertion loss may result in better power utilization and/or improved quality of wireless signals received by the transceivers. However, when operating in another mode, the shared antenna structure may allow the co-located radios to share a single antenna, thereby allowing each radio to virtually have its own antenna, with the realization that there is a corresponding amount of insertion loss when operating in this mode. Accordingly, the shared antenna structure improves co-existence of co-located radios, while reducing disadvantages associated with conventional antenna sharing techniques.

Embodiments of the present invention may involve a variety of wireless communications technologies. These technologies may include cellular and data networking systems. Exemplary data networking systems include wireless local area networks (WLANs), wireless metropolitan area networks (WMANs), and personal area networks (PANs).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of an apparatus that may communicate across different types of wireless links. In particular, FIG. 1 shows an apparatus 100 comprising various elements. The embodiments, however, are not limited to these depicted elements. FIG. 1 shows that apparatus 100 may include an antenna 110, a shared antenna structure 150, a first radio module 102, a second radio module 104, a host 106, and an interconnection medium 108. These elements may be implemented in hardware, software, firmware, or in any combination thereof.

Although apparatus 100 only shows two radio modules 102, 104, it may be appreciated that apparatus 100 may include more than two radio modules (and associated elements) as desired for a given implementation. Further, although apparatus 100 only shows a single antenna 110, it may be appreciated that apparatus 100 may include additional antennas for sharing with multiple transceivers. This may be desirable, for example, when a mobile computing device implements a wireless diversity scheme that utilizes an antenna array of two or more antennas to improve quality and reliability of a wireless link. An example of a wireless diversity scheme may include a multiple-input multiple-output (or variation thereof) system. In this case, one or both of the radio modules 102, 104 may share one or more antennas from the antenna array via the shared antenna structure 150.

First radio module 102 and second radio module 104 (and/or additional radio modules) may communicate with remote devices across different types of wireless links. For example, first radio module 102 and second radio module 104 may communicate across various data networking links. Examples of such data networking links include wireless local area network (WLAN) links, such as IEEE 802.11 WiFi links. Further examples include wireless metropolitan area (WMAN) links, such as IEEE 802.16 WiMAX links, and personal area networks (PAN) links such as Bluetooth links, Ultra-Wideband (UWB)/WiMedia links, and so forth.

Additionally or alternatively, first radio module 102 and second radio module 104 (and/or additional radio modules) may communicate across wireless links provided by one or more cellular systems. Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA), Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), and so forth. However, the embodiments are not limited to these examples. For instance, second radio module 104 may additionally or alternatively communicate across non-cellular communications links.

In one embodiment, for example, first radio module 102 is a WiFi device and second radio module 104 is a Bluetooth device. The embodiments, however, are not limited to these examples.

FIG. 1 shows that first radio module 102 includes a transceiver 114 and a communications controller 116. Transceiver 114 may transmit and receive wireless signals through an antenna 110 via shared antenna structure 150. As described above, these signals may be associated with wireless data networks, such as a WiFi link. However, the embodiments are not limited to such.

Communications controller 116 controls the operation of transceiver 114. For instance, communications controller 116 may schedule transmission and reception activity for transceiver 114. Such control and scheduling may be implemented through one or more control directives 126. Control directive(s) 126 may be based on operational status information 128, which communications controller 116 receives from transceiver 114. Also, such control directives may be based on status messages 136 received from radio module 104.

Further, communications controller 116 may perform operations on payload information 129 that it exchanges with transceiver 114. Examples of such operations include error correction encoding and decoding, packet encapsulation, various media access control protocol functions, and so forth.

As shown in FIG. 1, second radio module 104 includes a transceiver 118 and a communications controller 120. Transceiver 118 may also transmit and/or receive wireless signals through antenna 110 via shared antenna structure 150. As described above, these signals may also be associated with wireless data networks, such as a Bluetooth link. However, the embodiments are not limited to such.

Communications controller 120 controls the operation of transceiver 118. This may involve scheduling transmission and reception activity for transceiver 118. Such control and scheduling may be implemented through one or more control directives 122. Control directive(s) 122 may be based on operational status information 124, which communications controller 120 receives from transceiver 118. Also, such control directives may be based on status messages 134 received from radio module 102.

Additionally, communications controller 120 may perform operations on payload information 125 that it exchanges with transceiver 118. Examples of such operations include error correction encoding and decoding, packet encapsulation, various media access control protocol functions, and so forth.

In addition to performing the control operations described above, communications controllers 116, 120 may provide coordination between radio modules 102, 104. This coordination may involve the exchange of information. For instance, FIG. 1 shows that communications controller 116 may send status messages 134 to controller 120. Conversely, communications controller 120 may send status messages 136 to communications controller 116. These messages may be implemented as signals allocated to various signal lines. In such allocations, each message is a signal. However, further embodiments may alternatively employ data messages. Such data messages may be sent across various connections. Exemplary connections include parallel interfaces, serial interfaces, and bus interfaces.

Host 106 may exchange information with radio modules 102, 104. As shown in FIG. 1, such exchanges may occur across interconnection medium 108. For instance, host 106 may send information to these radio modules for wireless transmission. Conversely, radio modules 102 and 104 may send information to host 106 that was received in wireless transmissions. In addition, host 106 may exchange information with radio modules 102 and 104 regarding their configuration and operation. Examples of such information include control directives sent from host 106 to radio modules 102 and 104.

Furthermore, host 106 may perform operations associated with higher layer protocols and applications. For instance, host 106 may provide various user applications, such as telephony, text messaging, e-mail, web browsing, word processing, video signal display, and so forth. In addition, host 106 may provide one or more functional utilities that are available to various protocols, operations, and/or applications. Examples of such utilities include operating systems, device drivers, user interface functionality, and so forth.

Interconnection medium 108 provides for couplings among elements, such as first radio module 102, second radio module 104, and host 106. Thus, interconnection medium 108 may include, for example, one or more bus interfaces. Exemplary interfaces include Universal Serial Bus (USB) interfaces, Serial Peripheral Interconnect (SPI) interfaces, Secure Digital Input Output (SDIO) interfaces, as well as various computer system bus interfaces. Additionally or alternatively, interconnection medium 108 may include one or more point-to-point connections (e.g., parallel interfaces, serial interfaces, etc.) between various element pairings.

In general operation, apparatus 100 may engage in communications across multiple wireless links. However, as described above, co-located radios may need to share a single antenna (or antenna array).

In some cases, the co-located radios may need to share antenna 110 at the same time. For example, a user may desire to talk over a cellular voice call while using a Bluetooth headset, and using the internet via WiFi, or a user may desire to stream audio signals from a server over a WiFi link, and listen to the audio signals using a Bluetooth headset. In another example, a user may engage in a Voice Over Internet Protocol (VoIP) using a WiFi link, and communicate using a Bluetooth headset. In yet another example, a user may want to browse the Internet over a cellular data channel while talking on a cellular voice channel. In these cases the user may desire improved performance in a co-existence environment so that multiple radios can work together.

In other cases, the co-located radios may use antenna 110 at different times. For instance, a user may download audio files from a server over a WiFi link, and store them on a mobile computing device. The user may later listen to the stored audio files using a Bluetooth headset. In these cases the operation of the multiple transceivers may not be simultaneous, but rather sequential, so that a user may desire to have improved performance for each one stand-alone.

Conventional solutions for shared front ends are unsatisfactory for a number of reasons. For example, a switched front end offers reduced insertion loss, but performs poorly in a coexistence environment. A splitter front end performs better in the coexistence environment but suffers from permanent insertion loss offered by the splitter. Therefore both solutions provide sub-optimal performance for a mobile computing device.

Apparatus 100 solves these and other problems. In various embodiments, shared antenna structure 150 may be coupled to antenna 110 and control access to antenna 110 by the first radio module 102 and the second radio module 104. The shared antenna structure 150 may include a combiner and at least one switch arranged to allow the first transceiver 114 and the second transceiver 118 to share the antenna for simultaneous operations or mutually-exclusive operations. Simultaneous operations may refer to a mode when both transceivers 114, 118 are active and using antenna 110 at substantially the same time to transmit and/or receive wireless signals. This mode may be referred to as a "simultaneous mode." Mutually-exclusive operations may refer to a mode when one of transceivers 114, 118 is active and using antenna 110 to transmit and/or receive wireless signals. This mode may be referred to as a "mutually-exclusive mode" or "time-division switched mode." The multi-mode arrangement and operation of the shared antenna structure combine the advantages of the switched front end and splitter front end, while reducing the respective disadvantages associated with each solution. Apparatus 100 in general and shared antenna structure 150 in particular may be described in more detail with reference to FIG. 2A.

Figure 2A:
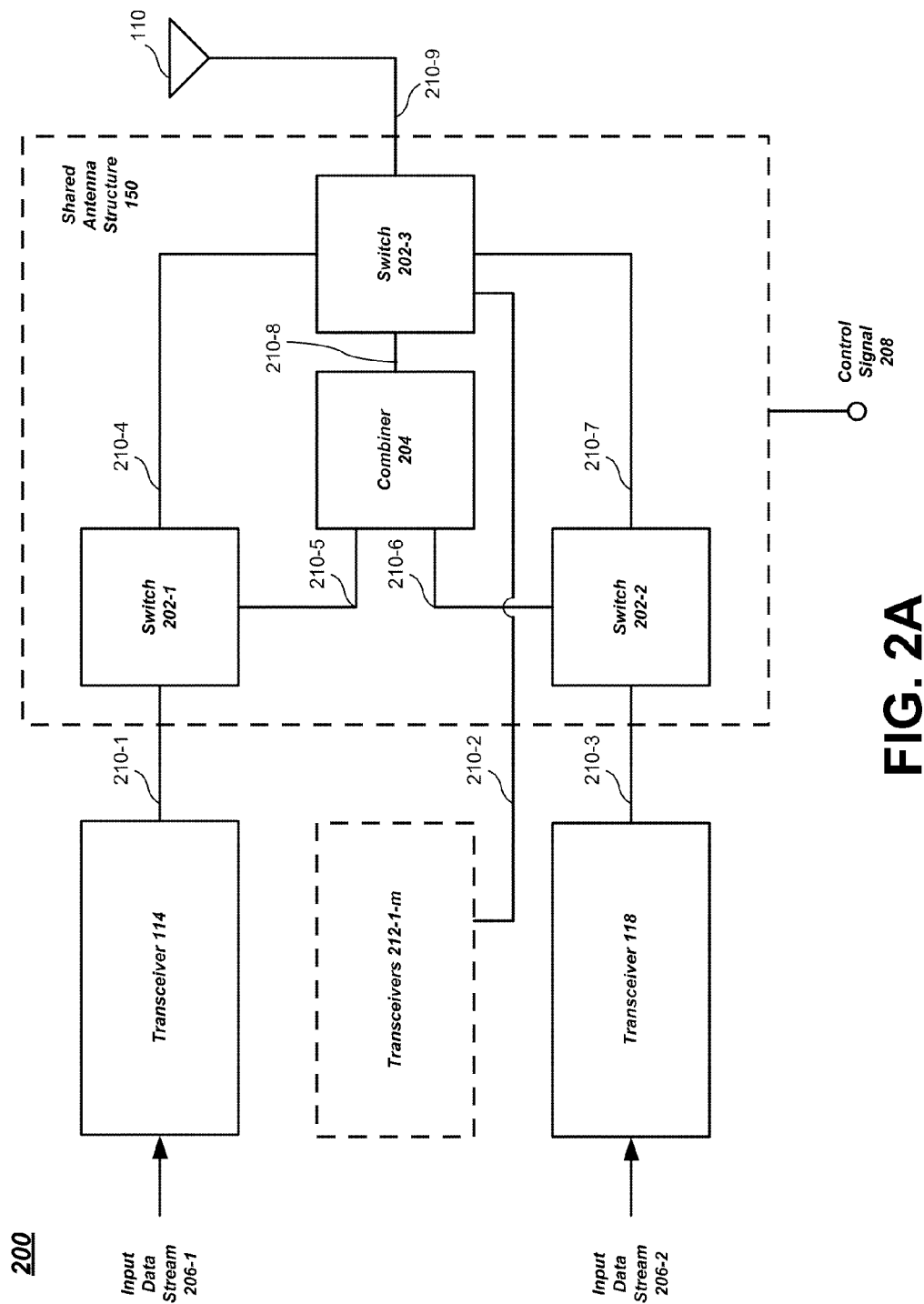
FIG. 2A illustrates one embodiment of a first shared antenna structure.

FIG. 2A illustrates an apparatus 200 having a more detailed block diagram for a first embodiment for the shared antenna structure 150. The shared antenna structure 150 shown in FIG. 2A comprises multiple switches 202-1-$p$ and at least one combiner 204.

The switches 202-1-$p$ may comprise any suitable circuit element capable of changing or switching connections between different input and output signal lines. Examples for the switches 202-1-$p$ may include without limitation a n-way type of switch (e.g., 2-way switch, 3-way switch, 4-way switch, and so forth), a series of successive switches (e.g., 2 single pole double-throw switches), a cross-bar switch connecting multiple inputs to multiple outputs in a matrix manner, and so forth. A particular type of radio-frequency (RF) switch implemented for a given embodiment may vary in accordance with a standard design considerations, including switch insertion, loss a number of inputs (e.g., 1 input) and a number of outputs (e.g., 2 outputs) for the switch, and so forth. The embodiments are not limited to this example.

The combiner 204 may comprise any suitable circuit element capable of combining multiple signals into a single signal in a forward path, or splitting a single signal into multiple signals in a reverse path. The former operation is typically performed by a combiner in a transmit path, while the latter operation is typically performed by a splitter in a receive path. As used herein, the term "combiner" is used to refer to both combining and splitting operations for clarity. In one embodiment, the combiner 204 may comprise a combination combiner/splitter. In other embodiments, however, the combiner 204 may be separated into different circuit elements for performing combining operations and splitting operations, as known to those skilled in the art. Examples for the combiner 204 may include without limitation a passive combiner, a power splitter, a diplexer, a duplexer, a triplexer, a multiplexer, a demultiplexer, and so forth. A particular type of combiner (or splitter) implemented for a given embodiment may vary in accordance with a standard design considerations, including combiner insertion loss, a number of inputs (e.g., 2 input signals) and a number of outputs (e.g., 1 output signal) for the combiner, and so forth. The embodiments are not limited to this example.

In the illustrated embodiment shown in FIG. 2A, a first switch 202-1 may be communicatively coupled to the first transceiver 114. A second switch 202-2 may be communicatively coupled to the second transceiver 118. The combiner 204 may be communicatively coupled to the first and second switches 202-1, 202-2. The combiner 204 may also be communicatively coupled to a third switch 202-3. The third switch 202-3 may be communicatively coupled to the first switch 202-1, the second switch 202-2, and the combiner 204. The third switch 202-3 may also be communicatively coupled to the antenna 110.

The shared antenna structure 150 may be arranged to operate in different sharing modes, including a simultaneous mode and a mutually-exclusive mode. In a simultaneous mode, both of the transceivers 114, 118 may utilize the antenna 110 at substantially the same time. In a mutually-exclusive mode, only one of the transceivers 114, 118 may utilize the antenna 110 at any point in time. The shared antenna structure 150 may be placed in a given mode in response to a control signal 208.

When operating in the simultaneous mode, in the transmit path, the transceivers 114, 118 may receive respective input data streams 206-1, 206-2, and process the respective input data streams 206-1, 206-2 for simultaneous transmission over the antenna 110. The switch 202-1 may connect lines 210-1, 210-5, and the switch 202-2 may connect lines 210-3, 210-6. The combiner 204 may combine the signals from lines 210-5, 210-6 to output the combined signal to line 210-8. The switch 202-3 may connect the lines 210-8, 210-9, thereby allowing the combined data streams 206-1, 206-2 to be simultaneously transmitted over the antenna 110. In the receive path, the signals received by the antenna 110 may follow a reverse path to the respective transceivers 114, 118.

When operating in a mutually-exclusive mode, in the transmit path, the switches 202-1-p may be arranged to allow only one of the transceivers 114, 118 to access the antenna 110 at a given moment in time. For instance, when the transceiver 114 is ready to transmit (or receive), the switch 202-1 may connect lines 210-1, 210-4 and the switch 202-3 may connect lines 210-4, 210-9. This allows the transceiver 114 to transmit data stream 206-1 over the antenna 110. When the transceiver 118 is ready to transmit (or receive), the switch 202-2 may connect lines 210-3, 210-7, and the switch 202-3 may connect lines 210-7, 210-9. This allows the transceiver 118 to transmit data stream 206-2 over the antenna 110. The reverse may occur in a receive path for either transceiver 114, 118. It may be appreciated that when in the mutually-exclusive mode, the combiner 204 is removed from the signal path, thereby reducing or eliminating any disadvantages associated with the combiner 204, such as insertion loss.

It is worthy to note that if transceiver 114 implements a Transmit/Receive switch for operation that there will be multiple connections between switch 202-1 and transceiver 114, and connection 210-1 represents only one of multiple connections desired for a given implementation. It is also worthy to note that the Transmit/Receive switch function can then be combined into switch 202-1 for further optimization in reducing insertion loss on both transmit and receive.

As previously described, the shared antenna structure 150 may share the antenna 110 with multiple transceivers 114, 118. The shared antenna structure 150 may also allow any number of additional transceivers to share the antenna 110 as desired for a given implementation. For instance, the apparatus 200 is shown as having one or more additional transceivers 212-1-$m$ connected to switch 202-3, thereby allowing the one or more additional transceivers 212-1-$m$ to use the antenna 110 in a mutually-exclusive mode. The shared antenna structure 150 may form a transmit and/or a receive path between the transceiver 212-1-$m$ and the antenna 110 by having the switch 202-3 connect the lines 210-2, 210-9. It may be appreciated that additional combiners 204 and/or switches 202-1-$p$ may be added to allow the additional transceivers 212-1-$m$ to share the antenna 110 in a simultaneous mode as well. The embodiments are not limited in this context.

Figure 2B:
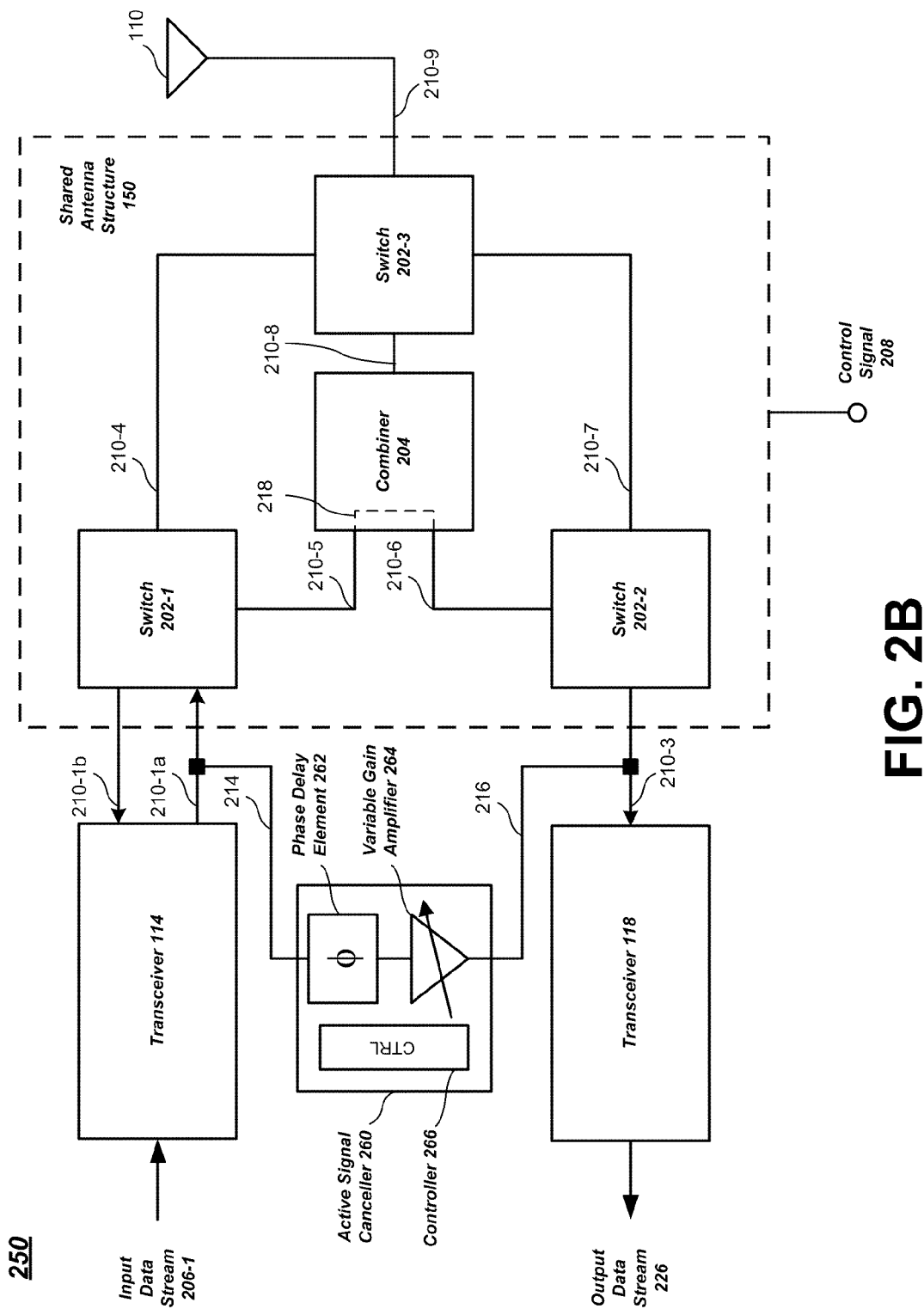
FIG. 2B illustrates one embodiment of a first shared antenna structure with an active noise canceller for enhanced isolation.

FIG. 2B illustrates an apparatus 250 having structure and operations similar to the apparatus 200 as described with reference to FIG. 2A, with an addition of an active signal canceller 260 to perform signal cancellation and enhance isolation between transceivers 114, 118, thereby improving simultaneous operations for the transceivers 114, 118.

As previously discussed, simultaneous operations for transceivers 114, 118 may create undesirable interference for the transceivers 114, 118 that may affect performance of one or both of the transceivers 114, 118. For instance, when the transceiver 114 is operating in a transmit mode it may create undesirable RF noise, EMI, cross-talk, and other interference signals that may affect sensitivity and performance of the transceiver 118 when operating in a receive mode, and vice-versa. This is due in part to the relative close proximity of the transceivers 114, 118. Such interference may also be created by the shared antenna structure 150. For instance, certain components for the shared antenna structure 150, such as the combiner 204, provide a path to allow residual leakage between the transceivers 114, 118 when one of the transceivers 114, 118 is transmitting. This may affect receiver sensitivity of the non-transmitting transceiver 114, 118 when attempting to receive signals from antenna 110.

To solve these and other problems, the apparatus 250 may include one or more active signal cancellers 260. An active signal canceller 260 is generally arranged to reduce, subtract, null or otherwise cancel unwanted interference created by one of the transceivers 114, 118 when operating in a transmit mode. The active signal canceller 260 attempts to subtract out as much residual leakage created by the various components coupled to the transceivers 114, 118, such as the combiner 204 of the shared antenna structure 150, among other components. This effectively synthesizes higher isolation at a much more affordable cost relative to conventional isolation techniques.

In the illustrated embodiment shown in FIG. 2B, the active signal canceller 260 may comprise a phase delay element 262, a variable gain amplifier (VGA) 264, and a controller 266. For ease of illustration and purposes of clarity, the illustrated embodiment shown in FIG. 2B assumes an implementation for the active signal canceller 260 for a case where the transceivers 114, 118 are in simultaneous operation, and where the transceiver 114 is transmitting and the transceiver 118 is receiving. It may be appreciated that the same principles described with reference to the illustrated embodiment shown in FIG. 2B, however, may be reversed for a case where the transceiver 118 is transmitting and the transceiver 114 is receiving. This may be accomplished in a number of different ways, including adding more signal lines, moving the active signal canceller 260, modifying the active signal canceller 260, adding more active signal cancellers 260, or some combination thereof. The embodiments are not limited in this context.

In various embodiments, the active signal canceller 260 may be implemented as an integrated circuit (IC). The active signal canceller 260 may be implemented as a separate chip, a part of a chip set, a system on a chip (SoC), on a same die as the transceivers 114, 118 and/or the shared antenna structure 150, or elsewhere within a mobile computing device. It may be appreciated that the active signal canceller 260 may comprise more or less elements than shown in FIG. 2B for a given implementation. The embodiments are not limited in this context.

In one embodiment, the active signal canceller 260 may be communicatively coupled to the transceivers 114, 118. For instance, the line 210-1 connecting the transceiver 114 to the switch 202-1 may be further defined into a transmit line 210-1a and a receive line 210-1b. An input for the phase delay element 262 may be connected to a transmit port of the transceiver 114 via the transmit line 210-1a and line 214. An output for the VGA 264 may be connected to a receive port of the transceiver 118 via the line 216 and the receive line 210-3.

The active signal canceller 260 may be arranged to generate a cancellation signal to cancel some or all of an interference signal for a radio-frequency (RF) coupling channel formed between the transceivers 114, 118 when one or both of the transceivers are transmitting information via the shared antenna structure 150 and the antenna 110. One or more RF coupling channels may be formed between the transceivers 114, 118 through various components connected to the transceivers 114, 118. For instance, an RF coupling channel 218 may be formed between the transceivers 114, 118 through the combiner 204 of the shared antenna structure 150. It may be appreciated that other RF coupling channels and interference sources may also be present in a mobile computing device implementing the apparatus 250, and the embodiments are not limited to the exemplary RF coupling channel 218.

An advantage of using the combiner 204 as part of the shared antenna structure 150 is that it facilitates simultaneous operations for the transceivers 114, 118 at the cost of a defined level of permanent insertion loss (e.g., 3-4 dB in simultaneous operation mode). Another disadvantage of using the combiner 204, however, is that it also allows formation of the RF coupling channel 218. When the transceiver 114 is transmitting information, a portion of the transmit signal passing through an input port of the combiner 204 is passed through the RF coupling channel 218, and is outputted from the other input port of the combiner 204. The portion of the transmit signal passing through the RF coupling channel 218 is referred to herein as an "interference signal." The interference signal combines with a receive signal intended for a receive port of the transceiver 118. Some of this RF interference may result in constructive interference that distorts the receive signal making it harder to recover by a receive portion of the transceiver 118. The active signal canceller 260 may be used to mitigate or cancel some or all of the RF interference passing through the RF coupling channel 218 (and possibly other interference sources).

The active signal canceller 260 may include the phase delay element 262. The phase delay element 262 may generally be arranged to modify or shift a phase for an input signal. In one embodiment, for example, the phase delay element 262 may be arranged to input a transmit signal of the transceiver 114 from a transmit port of the transceiver 114 via the lines 210-1a, 214. The phase delay element 262 may modify a phase for the transmit signal so that it is out of phase with the interference signal of the RF coupling channel 218. Changing a phase for the transmit signal provides for destructive interference to cancel out or null the interference signal. In one embodiment, for example, the phase delay element 262 may modify a phase for the transmit signal approximately 180 degrees. The phase delay element 262 then outputs the phase modified transmit signal as an intermediate cancellation signal to the VGA 264.

The active signal canceller 260 may include the VGA 264. The VGA 264 is an electronic amplifier that is generally arranged to vary an amount of gain applied to an input signal depending on a control voltage. In one embodiment, for example, the VGA 264 may be arranged to input the intermediate cancellation signal received from the phase delay element 262. The VGA 264 may modify a gain for the intermediate cancellation signal. For instance, the VGA 264 may modify a gain for the intermediate cancellation signal to match an estimated power level (or power ratio) for the interference signal. The VGA 264 then outputs the gain modified intermediate cancellation signal as a cancellation signal to the receive port of the transceiver 118 via the lines 216, 210-3.

The active signal canceller 260 may output a cancellation signal to a receive port of the transceiver 118 to cancel the interference signal from a receive signal for the transceiver 118. When operating in a receive mode, a receive portion of the transceiver 118 may receive a receive signal at a receive port for the transceiver 118 via the antenna 110 and the shared antenna structure 150. For instance, a receive signal may follow a signal path from the antenna 110 that includes the switch 202-3, the combiner 204, the switch 202-2, and their respective connecting lines 210-9, 210-8, 210-6 and 210-3. While traversing the combiner 204, an interference signal from the transceiver 114 may cause constructive interference with the receive signal from the antenna 110. A cancellation signal from line 216 may combine with the receive signal having the added interference, and cause destructive interference to cancel out some or all of the interference added to the receive signal. Depending on a given implementation, a dynamic range for cancellation amounts may reach approximately 10 dB or more. This could significantly improve receiver sensitivity for the transceiver 118.

The active signal canceller 260 may also comprise the controller 266. In one embodiment, for example, the controller 266 may comprise a micro-controller having one or more logic circuits, memory units, registers, state machines, look-up tables (LUT), and so forth. The controller 266 may be arranged to retrieve and/or generate control parameters for the phase delay element 262 and the VGA 264. For instance, different control parameters for different use scenarios may be stored in a LUT in the controller 266. The controller 266 may retrieve appropriate control parameters for a given use scenario, and communicate the control parameters to the respective phase delay element 262 and the VGA 264 to dynamically generate a cancellation signal suitable for a given implementation. The different control parameters may be selected based on various factors such as an amount of interference, a type of interference, an interference source, a particular radio type (or protocol), a given Quality of Service (QoS) level, a received signal strength indication (RSSI), a given power level (or power ratio), signal-to-interference ratio (SIR), signal-to-noise ratio (SNR), carrier-to-interference ratio (CIR), carrier-to-noise ratio (CNR), and other factors. The embodiments are not limited in this context.

By way of example, assume the transceiver 114 is a Bluetooth transceiver and the transceiver 118 is a WiFi transceiver. The active signal canceller 260 is operative to add a defined amount of a transmit signal (at the correct phase) to subtract it from the receive port of the other radio. For instance, assuming a Bluetooth transmit signal is at 0 dBm at an input port to the combiner 204, this same transmit signal will provide approximately −25 dBm of interference at the other input port of the combiner 204 via the RF coupling channel 218. This level of interference may substantially reduce receiver sensitivity for a WiFi receiver due to normal non-linearities present in the WiFi front end. However, if a copy of the Bluetooth transmit signal is added to the receive port of the WiFi transceiver at a reverse phase and a correct gain level, the interference can be fully or partially cancelled out. Cancellation amounts of approximately 10 dB may be achieved using this technique, which could significantly improve radio co-existence performance.

Although various embodiments of the active signal canceller 260 are shown implemented with the shared antenna structure 150 having a single antenna 110, it may be appreciated that other embodiments of the active signal canceller 260 may be implemented without the shared antenna structure. For instance, each of the transceivers 114, 118 may have one or more antennas 110. The active signal canceller 260 may be implemented in a multiple antenna configuration to provide additional isolation at a reasonable cost. This may be useful, for example, if the intrinsic isolation between antennas 110 is not high enough for a given implementation. The added isolation may be even higher in this case relative to using a single antenna, since a multiple antenna configuration does not typically implement a coupler or splitter, and therefore does not have the corresponding transmit power and receive sensitivity penalty associated with the coupler or splitter.

Figure 3A:
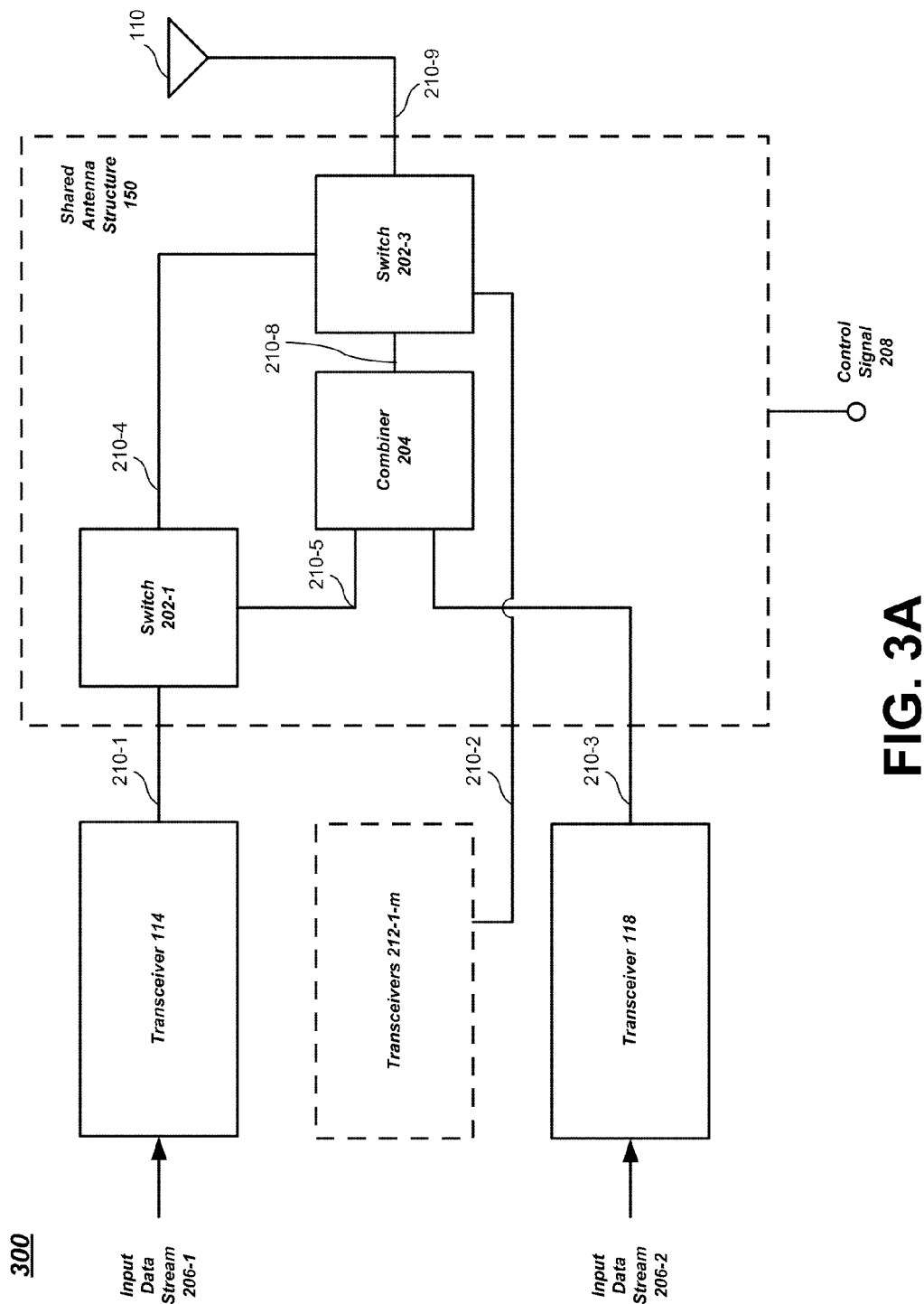
FIG. 3A illustrates one embodiment of a second shared antenna structure.

FIG. 3A illustrates an apparatus 300 having a more detailed block diagram of a second embodiment for the shared antenna structure 150. The shared antenna structure 150 shown in FIG. 3A also comprises multiple switches 202-1-$p$ and at least one combiner 204. The shared antenna structure 150 shown in apparatus 300 may be similar to the shared antenna structure 150 shown in apparatus 200. For instance, the shared antenna structure 150 may comprise the switch 202-1 communicatively coupled to the transceiver 114, the combiner 204 communicatively coupled to the switch 202-1 and the transceiver 118, and the switch 202-3 communicatively coupled to the switch 202-1 and the combiner 204. Unlike apparatus 200, however, the shared antenna structure 150 of apparatus 300 eliminates switch 202-2, thereby reducing complexity and cost for the shared antenna structure 150. This may be significant due to the relatively high costs associated with switching elements. It may be appreciated, however, that the insertion loss provided by the combiner 204 is incurred both in the simultaneous mode and when the transceiver 118 is operating in the mutually-exclusive mode. However, this may be an acceptable trade-off in cost and performance for some implementations. It may be further appreciated that a similar arrangement for the shared antenna structure 150 may be made for the transceiver 114 to shift the insertion loss penalty to transmit/receive path for the transceiver 114.

The shared antenna structure 150 may be placed in a given mode in response to a control signal 208. Control for the shared antenna structure 150 may be described in more detail with reference to FIGS. 5-6.

Figure 3B:
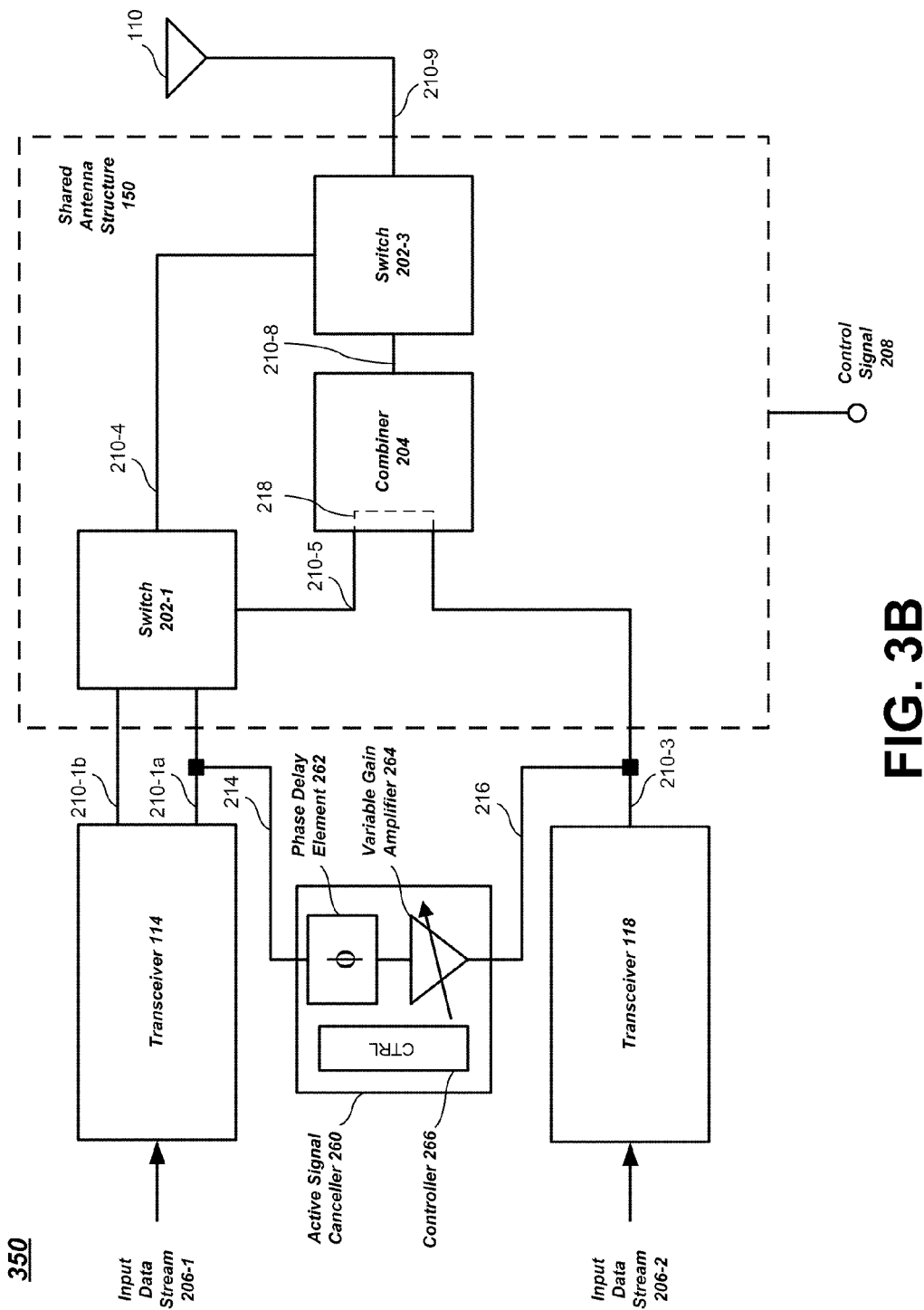
FIG. 3B illustrates one embodiment of a second shared antenna structure with an active noise canceller for enhanced isolation.

FIG. 3B illustrates an apparatus 350 having structure and operations similar to the apparatus 300 as described with reference to FIG. 3A, with an addition of the active signal canceller 260 to perform signal cancellation and enhance isolation between transceivers 114, 118. As with the apparatus 250 described with reference to FIG. 2B, the apparatus 350 shown in FIG. 3B provides improved isolation between the transceivers 114, 118 by reducing or cancelling interference components created by one of the transceivers 114, 118 when transmitting from a receive signal for the other of the transceivers 114, 118 when receiving.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 4:
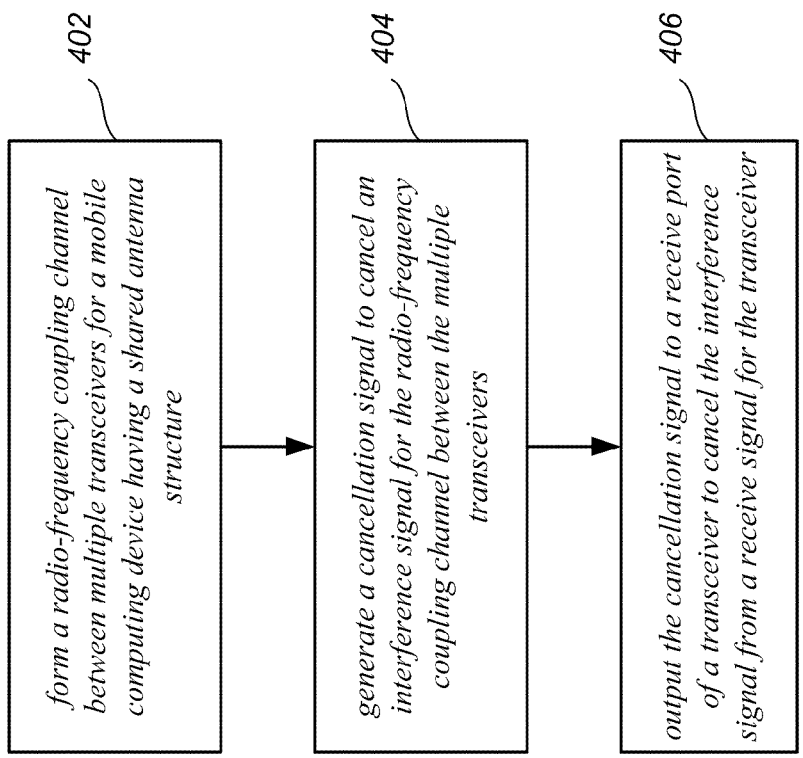
FIG. 4 illustrates one embodiment of a logic flow.

FIG. 4 illustrates one embodiment of a logic flow 400. Logic flow 400 may be representative of the operations executed by one or more embodiments described herein. For example, logic flow 400 may be operations performed by the active signal canceller 260.

The logic flow 400 may form a radio-frequency coupling channel between multiple transceivers for a mobile computing device having a shared antenna structure at block 402. For example, the shared antenna structure 150 may form the RF coupling channel 218 between multiple transceivers 114, 118 for a mobile computing device when operating in a simultaneous operational mode. The RF coupling channel 218 allows interference from a transmit signal for one of the transceivers 114, 118 to affect a receive signal for the other transceiver 114, 118. For instance, the transceiver 114 may transmit information that creates RF interference for a receive signal intended for the transceiver 118.

The logic flow 400 may generate a cancellation signal to cancel an interference signal for the radio-frequency coupling channel between the multiple transceivers at block 404. For example, the active signal canceller 260 may generate a cancellation signal to cancel an interference signal for the RF coupling channel 218 between the multiple transceivers 114, 118. For instance, the active signal canceller 260 may receive a portion of the transmit signal from the transceiver 114, and modify a phase and/or gain for the transmit signal to form a cancellation signal.

The logic flow 400 may output the cancellation signal to a receive port of a transceiver to cancel the interference signal from a receive signal for the transceiver at block 406. For example, the active signal canceller 260 may output the cancellation signal to a receive port of one of the transceivers 114, 118 to cancel the interference signal from a receive signal for one of the transceivers 114, 118. For instance, the active signal canceller 260 may output a cancellation signal for a receive signal intended for the receive port of the transceiver 118. The (phase and gain corrected) cancellation signal may be added to the receive signal to null or cancel out the interference provided by the RF coupling channel 218.

Figure 5:
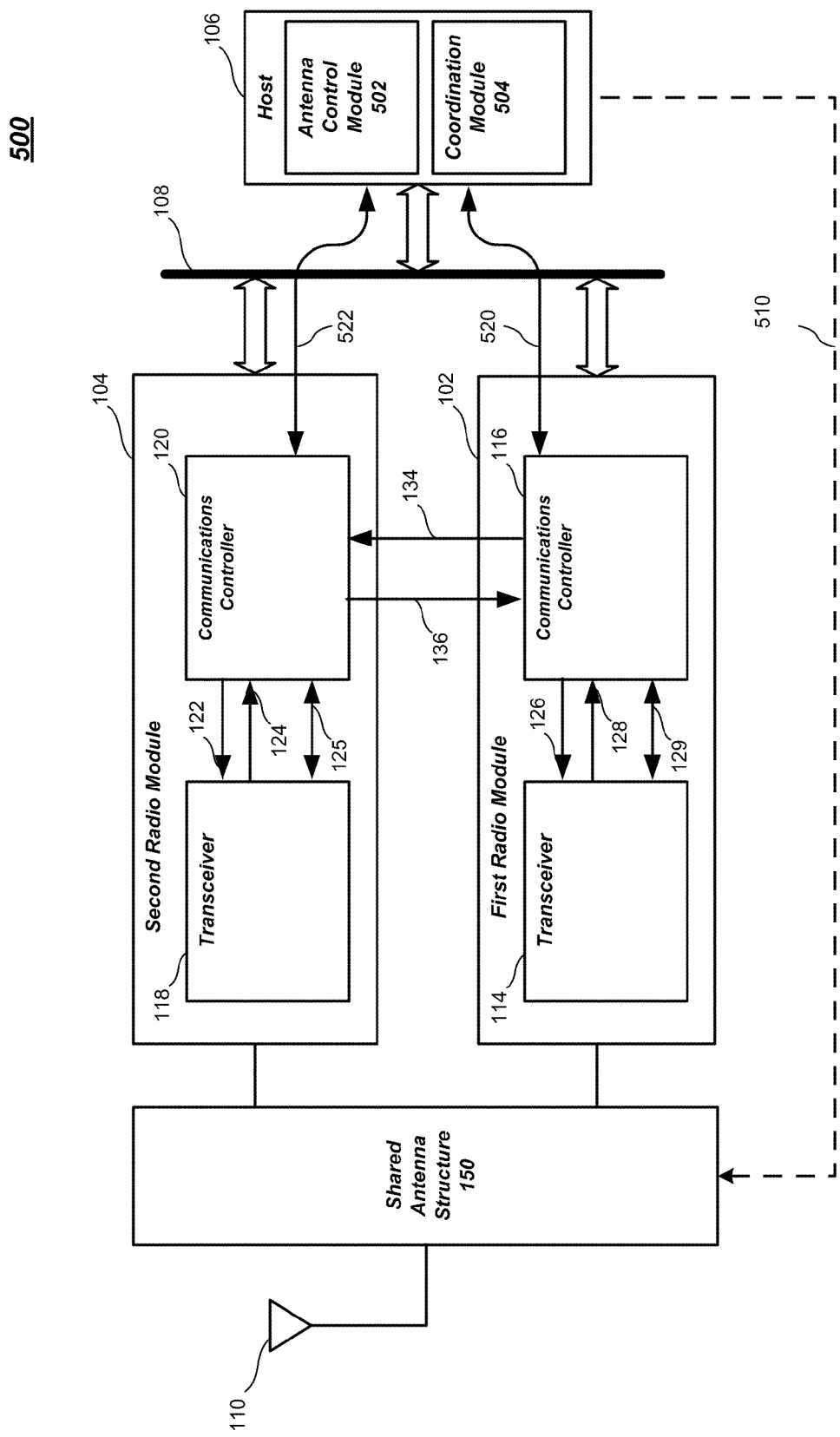
FIG. 5 illustrates one embodiment of a second apparatus.

FIG. 5 illustrates one embodiment of an apparatus 500. The apparatus 500 may be similar to the apparatus 100. In addition, the apparatus 500 may implement an antenna control module 502 and a coordination module 504. The antenna control module 502 and the coordination module 504 may be implemented in hardware, software, firmware, or in any combination thereof. For instance, features of modules 502, 504 may be implemented with instructions or logic (e.g., software) that is provided on a storage medium for execution by one or more processors. For such implementations, modules 502, 504 may each be implemented on a dedicated processor. Alternatively, a processor may be shared among modules 502, 504 (as well as among other elements). In the illustrated embodiment shown in FIG. 5, the antenna control module 502 and the coordination module 504 are implemented as software or firmware for the host 106. The antenna control module 502 or the coordination module 504 may be implemented by other processors, such as one or more communications controllers 116, 120, or a dedicated hardware or software controller for the shared antenna structure 150. The embodiments are not limited in this context.

In the illustrated embodiment shown in FIG. 5, the antenna control module 502 may be communicatively coupled to the shared antenna structure 150 either directly or indirectly via radio modules 102, 104. The antenna control module 502 may be operative to receive information representing activity for the first and second transceivers 114, 118, and arrange the shared antenna structure 150 for simultaneous operations or mutually-exclusive operations. The antenna control module 502 may receive activity information, and generate a control directive or control signal based on the activity information. The antenna control module 502 may passed the control directive or control signal directly to the shared antenna structure 150 via line 510, or indirectly to the shared antenna structure 150 via the radio modules 102, 104 and respective lines 520, 522.

In one embodiment, for example, the antenna control module 502 may be operative to receive information representing activity for the transceivers 114, 118, and arrange the shared antenna structure for simultaneous operations when both transceivers 114, 118 have a level of activity above a set of defined thresholds.

In one embodiment, for example, the antenna control module 502 may be operative to receive information representing activity for the first and second transceivers 114, 118, and arrange the shared antenna structure 150 for mutually-exclusive operations when one of the first or second transceivers 114, 118 have a level of activity above a defined threshold, and another of the first or second transceivers 114, 118 have a level of activity below a defined threshold.

In one embodiment, the defined thresholds for the transceivers 114, 118 may be the same. In another embodiment, the defined thresholds may be different thresholds for each radio, such as different parameters, different detection levels, and so forth.

Referring again to FIGS. 1 and 5, the radio modules 102, 104 may include respective communications controllers 116, 120 communicatively coupled to the respective transceivers 114, 118. The communications controllers 116, 120 may exchange information between their respective transceivers 114, 118. The communications controllers 116, 120 may also be operative to exchange information regarding operation of the transceivers 114, 118, and schedule operations for the transceivers 114, 118 based on the exchanged information. In this case, the communications controllers 116, 120 operate as peer elements. Additionally or alternatively, the communications controllers 116, 120 may be operative to exchange information with the coordination module 504. In this case, the coordination module 504 may operate as a master while the communications controllers 116, 120 operate as slaves to the coordination module 504.

The communications controllers 116, 120 may be implemented in hardware, software, firmware, or in any combination thereof. For instance, features of communications controllers 116, 120 may be implemented with instructions or logic (e.g., software) that is provided on a storage medium for execution by one or more processors. For such implementations, communications controllers 116, 120 may each include a dedicated processor (e.g., a baseband processor). Alternatively, such processors may be shared among controllers 116, 120 (as well as among other elements).

The communications controllers 116, 120 may control activities of a corresponding transceiver 114, 118. This may involve sending one or more directives to the corresponding transceiver. To provide such control, the communications controllers 116, 120 may include various logic, routines, and/or circuitry that operate on information received from other radio modules. In embodiments, one or more processors may execute such logic and routines.

Such control may involve scheduling the corresponding transceiver's transmit and receive activities. This scheduling may involve determining when transmissions should be limited or prohibited. For instance, communications controllers 116, 120 may prohibit its corresponding transceivers 114, 118 from transmitting signals based on information received from the other radio. An example of such information is an indication that another radio is currently receiving transmissions.

In embodiments, communications controllers 116, 120 may receive status data from the corresponding transceivers 114, 118. The status data may include various types of information. For instance, the status data may convey timing information. This may be in the form of clock or synchronization pulses. However, the status data may convey other information as well.

The communications controllers 116, 120 may exchange information with each other. This exchange may involve providing one or more radio modules 102, 104 with operational information. For instance, communications controllers 116, 120 may exchange notifications conveying information regarding the corresponding transceiver's activities or operational status. Status registers may be used to store variables and information regarding such activities or operational status. Based on such notifications, communications controllers 116, 120 may send associated messages or signals to each other. In addition, communications controllers 116, 120 may send control directives to the corresponding transceivers 114, 118 for appropriate action (if any). The communications controllers 116, 120 may employ various techniques to exchange information with each other. For example, the communications controllers 116, 120 may activate and/or detect activated signal lines. Such signal lines may be dedicated to particular signals. Alternatively, communications controllers 116, 120 may generate data messages to be transmitted across various connections. Exemplary connections may include a parallel interface, a serial interface, a bus interface, and/or a data network.

Coordination module 504 may control operations of transceivers 114, 118. This may include scheduling transmission and reception activity for transceivers 114, 118. Such control may be based on operational status of transceivers 114, 118. Control and coordination of transceivers may involve the exchange of information between coordination module 504 and the communication controllers of each radio module 102, 104. For instance, FIG. 5 shows coordination module 504 exchanging information via line 520 with communications controller 116 and information via line 522 with communications controller 120.

This information may include status data sent to coordination module 504. Such status data may originate as operational status information provided by transceivers 114, 118. Further, this information may include commands sent to communications controllers 116, 120. In turn, these communications controllers may forward associated control directives to transceivers 114, 118, respectively. The information may be implemented as signals allocated to various signal lines, data messages, and so forth. This information may be sent across various interconnection medium 108 or alternative connections.

Figure 6:
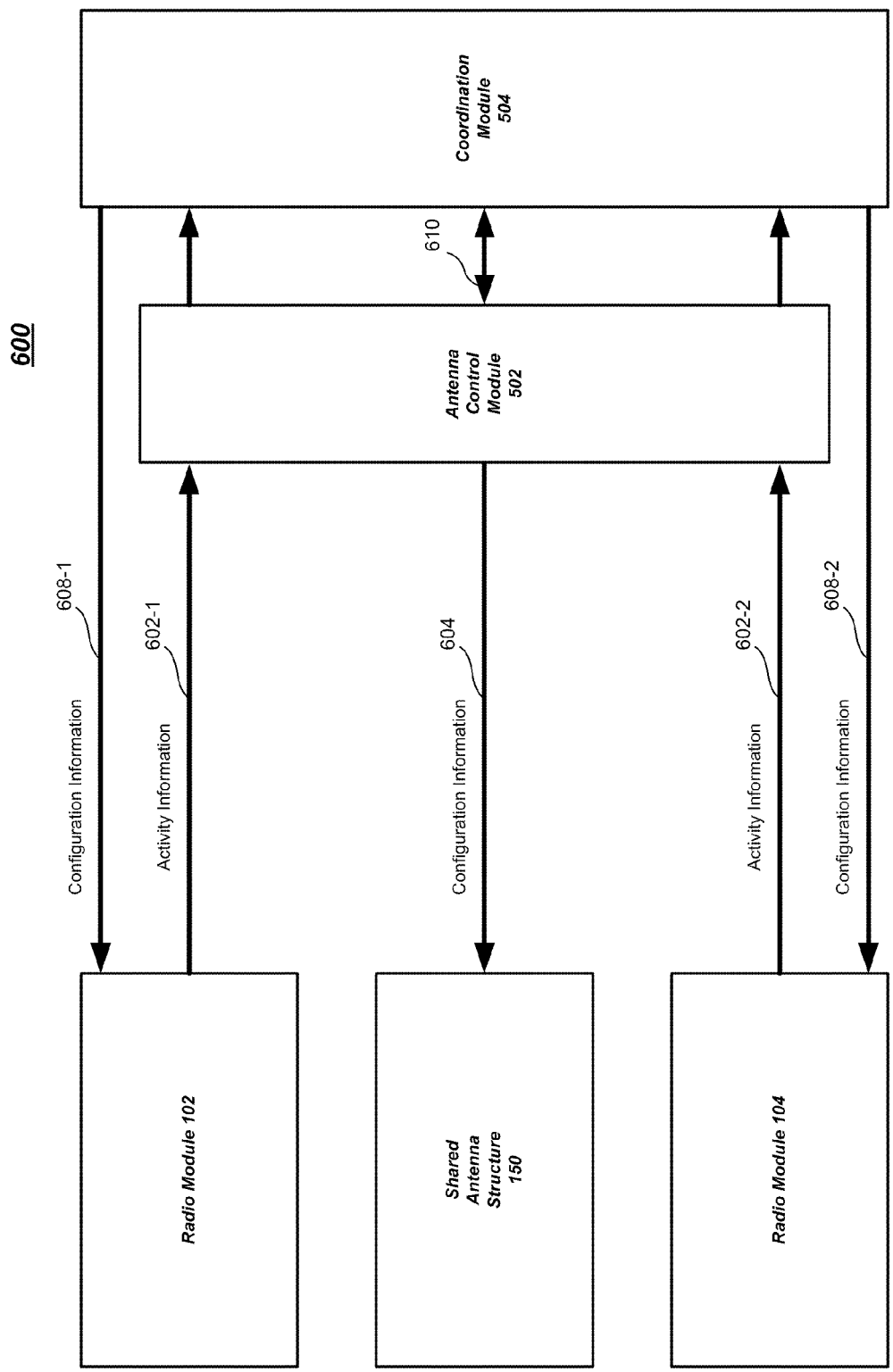
FIG. 6 illustrates one embodiment of an antenna control module.

FIG. 6 is a diagram 600 illustrating exemplary coordination that may be performed by antenna control module 502, radio modules 104, 102, and the shared antenna structure 150. As shown in FIG. 6, radio modules 102, 104 may send activity information 602-1, 602-2 to the antenna control module 502. Antenna control module 502 may generate and send configuration information 604 to the shared antenna structure 150 based on the activity information 602-1, 602-2. The configuration information 604 may indicate whether the shared antenna structure 150 is placed in a simultaneous mode or a mutually-exclusive mode. The configuration information 604 may be in the form of a control signal or message.

Diagram 600 also illustrates exemplary coordination that may be performed by coordination module 504 and the radio modules 102, 104. The coordination module 504 may be operative to receive information regarding operation of the transceivers 114, 118, and schedule operations for the transceivers 114, 118 based on the received information. As shown in FIG. 6, antenna control module 502 may forward activity information 602-1, 602-2 to the coordination module 504. Additionally or alternatively, the radio modules 102, 104 may exchange information directly with the coordination module 504 via the lines 520, 522. The coordination module 504 may send coordination information 608-1, 608-2 to the respective radio modules 102, 104 based on the activity information 602-1, 602-2. For instance, coordination module 504 may delay, slow-down, or prevent one or both radio modules 102, 104 from transmitting wireless signals.

The antenna control module 502 and the coordination module 504 may also exchange information to affect performance of the radio modules 102, 104 and/or the shared antenna structure 150 via line 610. For instance, the antenna control module 502 and the coordination module 504 may exchange information to control how long the shared antenna structure 150 is in a simultaneous mode or a mutually-exclusive mode. Reducing an amount of time the shared antenna structure 150 is in a simultaneous mode reduces an amount of insertion loss caused by the combiner 204 of the antenna control module 150. This may provide a technical advantage under certain conditions.

An exemplary use scenario may include when the shared antenna structure 150 is arranged to operate in a simultaneous mode, but the quality of the wireless signals fall below a desired threshold for one or both transceivers 114, 118. In this case, the coordination module 504 may instruct one of the transceivers 114, 118 to delay or prevent operations, and instruct the antenna control module 502 to change the shared antenna structure from the simultaneous mode to a mutually-exclusive mode for one of the transceivers 114, 118. This reduces or obviates the insertion loss associated with the circuit elements providing the simultaneous mode, thereby making more power available to increase range, signal strength or quality. A selection of which of the transceivers 114, 118 to delay or prevent operation may be performed in accordance with any desired criterion, such as assigned priority levels, signal strengths, or quality for the respective transceivers 114, 118.

Another exemplary use scenario may include monitoring a power level for a battery. When a power level for the battery falls below a certain defined threshold, one or both of the transceivers may need to be turned off to conserve power. In this case, the coordination module 504 may instruct one of the transceivers 114, 118 to delay or prevent operations, and instruct the antenna control module 502 to change the shared antenna structure from the simultaneous mode to a mutually-exclusive mode for one of the transceivers 114, 118. This reduces or obviates the insertion loss associated with the circuit elements providing the simultaneous mode, thereby extending battery life for a mobile device.

These are merely a few exemplary use scenarios, and it may be appreciated that the antenna control module 502 and the coordination module 504 may exchange information and coordinate operations between the radio modules 102, 104 and the shared antenna structure 150 to further enhance performance of a wireless device. The embodiments are not limited to these examples.

Additionally or alternatively, a case may exist where one of the radio modules 102, 104 support multiple RF bands of operation. If so, the antenna control module 502 and/or the coordination module 504 may exchange information to use alternate bands in a manner that reduces or eliminates mutually-induced interference. For instance, if the radio module 102 is implemented as a WiFi transceiver arranged to utilize both the 2.4 GHz and 5.8 GHz RF bands and the radio module 104 is implemented as a Bluetooth transceiver, and the user desires simultaneous operations, the antenna control module 502 and/or the coordination module 504 may exchange information to have the radio module 102 switch to a non-interfering RF band (if available and authorized) and the shared antenna structure 150 establish a signal path that avoids use of the combiner 204 in a dual antenna configuration, or reduce interference in a single dual-band antenna configuration. The embodiments are not limited in this context.

Figure 7:
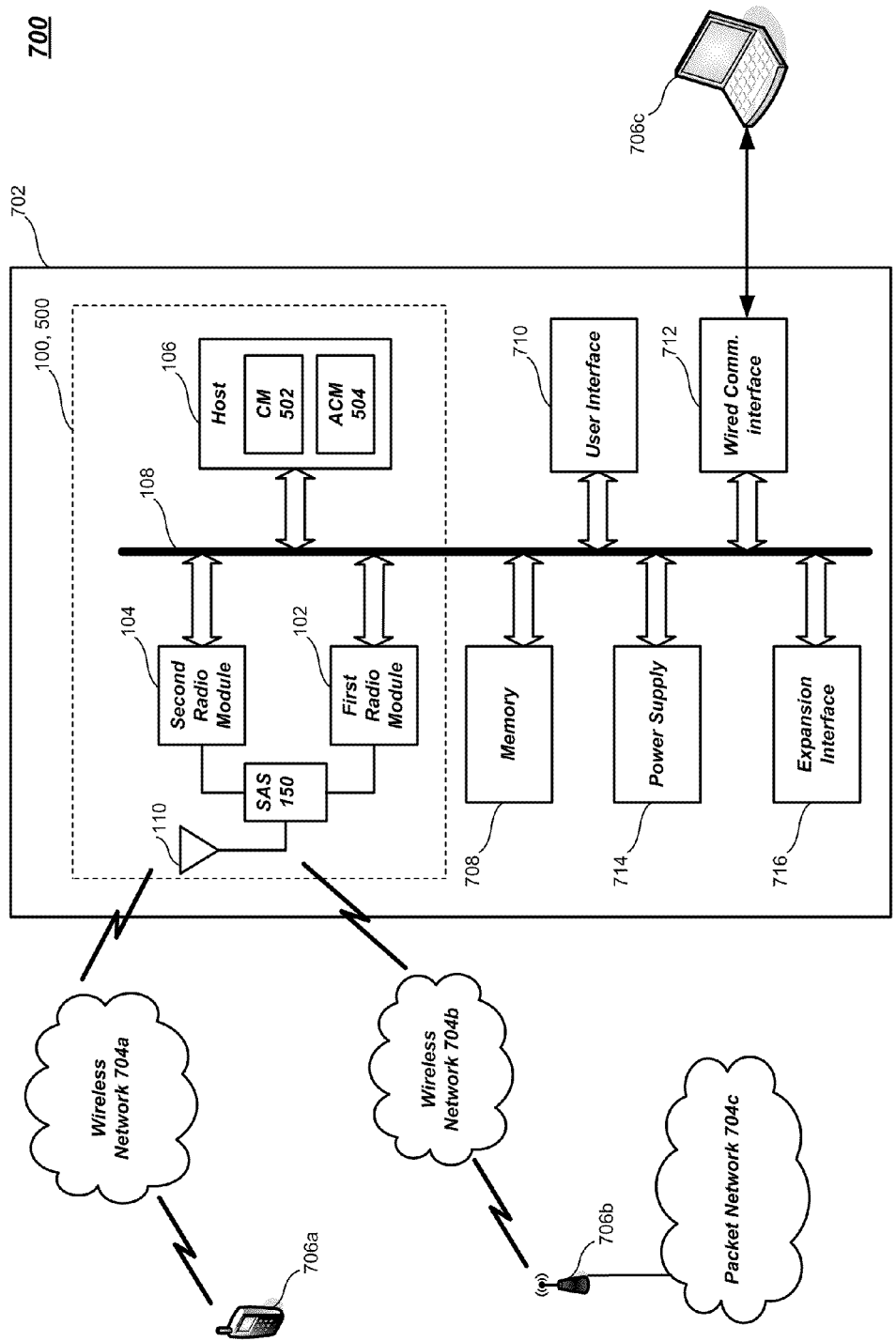
FIG. 7 illustrates one embodiment of a system.

FIG. 7 illustrates an embodiment of a system 700. This system may be suitable for use with one or more embodiments described herein, such as apparatus 100, apparatus 200, apparatus 300, logic flow 400, apparatus 500, diagram 600, and so forth. Accordingly, system 700 may engage in wireless communications across various link types, such as the ones described herein. In addition, system 700 may perform various user applications.

As shown in FIG. 7, system 700 may include a device 702, multiple communications networks 704, and one or more remote devices 706. FIG. 7 shows that device 702 may include the elements of FIG. 1. Additionally or alternatively, device 702 may include the elements of FIG. 5. In the illustrated embodiment shown in FIG. 7, device 702 may include a memory 708, a user interface 710, a wired communications interface 712, a power supply 714, and an expansion interface 716.

Device 702 may illustrate any wireless device suitable for implementing various embodiments as described herein. The wireless device may comprise a mobile or stationary device. In one embodiment, for example, the device 702 may be implemented as a combination handheld computer and mobile telephone, sometimes referred to as a smart phone. It can be appreciated that the device may comprise a computing device having a handheld form factor. While certain exemplary embodiments may be described with the device 702 implemented as a smart phone by way of example, the device 702 may be implemented as other types of computing devices such as a mobile telephone, a software telephone phone running on a computer, or other suitable computing device having computing and communications capabilities in accordance with the described embodiments. Exemplary computing devices may include a personal computer (PC), desktop PC, notebook PC, laptop computer, smart phone, mobile telephone, personal digital assistant (PDA), combination mobile telephone/PDA, mobile computing device, user equipment (UE), mobile unit, subscriber station, video device, television (TV) device, digital TV (DTV) device, high-definition TV (HDTV) device, media player device, gaming device, messaging device, pager, mobile internet device, tablet, netbook, or any other suitable communications device in accordance with the described embodiments.

Memory 708 may store information in the form of data. For instance, memory 708 may contain application documents, e-mails, sound files, and/or images in either encoded or unencoded formats. Alternatively or additionally, memory 708 may store control logic, instructions, and/or software components. These software components include instructions that can be executed by one or more processors. Such instructions may provide functionality of one or more elements in system 700. Exemplary elements include host 106, one or more components within radio modules 102 and 104, user interface 710, and/or communications interface 712.

Memory 708 may be implemented using any machine-readable or computer-readable media capable of storing data, including both volatile and non-volatile memory. For example, memory 708 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 708 may be included in other elements of system 700. For instance, some or all of memory 708 may be included on a same integrated circuit or chip with elements of apparatus 100. Alternatively some portion or all of memory 708 may be disposed on an integrated circuit or other medium, for example a hard disk drive, which is external. The embodiments are not limited in this context.

User interface 710 facilitates user interaction with device 702. This interaction may involve the input of information from a user and/or the output of information to a user. Accordingly, user interface 710 may include one or more devices, such as a keyboard (e.g., a full QWERTY keyboard), a keypad, a touch screen, a microphone, and/or an audio speaker. In addition, user interface 710 may include a display to output information and/or render images/video processed by device 702. Exemplary displays include liquid crystal displays (LCDs), plasma displays, and video displays.

Wired communications interface 712 provides for the exchange of information with a device 706c (e.g., a proximate device), such as a personal computer. This exchange of information may be across one or more wired connections. Examples of such connections include USB interfaces, parallel interfaces, and/or serial interfaces. In addition, interface 712 may provide for such exchanges across wireless connection(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 712 may include various components, such as a transceiver and control logic to perform operations according to one or more communications protocols. In addition, communications interface 712 may include input/output (I/O) adapters, physical connectors to connect the I/O adapter with a corresponding communications medium.

FIG. 7 shows that device 702 may communicate across wireless networks 704a and 704b. In particular, FIG. 7 shows communications across network 704a being handled by second radio module 104, and communications across network 704b being handled by first radio module 102. Accordingly, first wireless network 704a may be a cellular network, while second wireless network 704b may be a wireless data network. However, the embodiments are not limited to these examples.

Such wireless communications allow device 702 to communicate with various remote devices. For instance, FIG. 7 shows device 702 engaging in wireless communications (e.g., telephony or messaging) with a mobile device 706a. In addition, FIG. 7 shows device engaging in wireless communications (e.g., WLAN, WMAN, and/or PAN communications) with an access point 706b. In turn access point 706b may provide device 702 with access to further communications resources. For example, FIG. 7 shows access point 706b providing access to a packet network 704c, such as the Internet.

Power supply 714 provides operational power to elements of device 702. Accordingly, power supply 714 may include an interface to an external power source, such as an alternating current (AC) source. Additionally or alternatively, power supply 714 may include a battery. Such a battery may be removable and/or rechargeable. However, the embodiments are not limited to these examples.

Expansion interface 716 may be in the form of an expansion slot, such as a secure digital (SD) slot. Accordingly, expansion interface 716 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
an antenna;
a first transceiver that is to communicate wirelessly across a first link;
a second transceiver that is to communicate wirelessly across a second link;
a combiner that is to allow the first transceiver and the second transceiver to share the antenna for simultaneous operation;
an antenna switch that is to select one of the first transceiver and the second transceiver to exclusively use the antenna; and
an active signal canceller that is to generate a cancellation signal to cancel an interference signal for a radio-frequency (RF) coupling channel between the first and second transceivers when the first transceiver is transmitting via the antenna.

2. The apparatus of claim 1, wherein the active signal canceller comprises a phase delay element to receive a transmit signal from the first transceiver, to modify a phase of the transmit signal, and to generate an intermediate cancellation signal.

3. The apparatus of claim 2, wherein the phase delay element modifies the phase of the transmit signal by approximately 180 degrees.

4. The apparatus of claim 2, wherein the active signal canceller comprises a variable gain amplifier to receive the intermediate cancellation signal, to modify an amount of gain applied to the intermediate cancellation signal, and to generate the cancellation signal.

5. The apparatus of claim 4, wherein the active signal canceller comprises a controller to generate control parameters for the phase delay element and the variable gain amplifier to generate the cancellation signal.

6. The apparatus of claim 4, wherein the cancellation signal is provided to the second transceiver to cancel the interference signal.

7. The apparatus of claim 1, wherein the RF coupling channel between the first and second transceivers includes a residual signal leakage across the combiner.

8. The apparatus of claim 1, further comprising a first switch coupled to the first transceiver, a second switch coupled to the second transceiver, the combiner coupled to the first and second switches, and the antenna switch coupled to the first switch, the second switch and the combiner.

9. The apparatus of claim 1, further comprising a first switch coupled to the first transceiver, the combiner coupled to the first switch and the second transceiver, and a second switch coupled to the first switch and the combiner.

10. A method, comprising:
forming a radio-frequency coupling channel between a first transceiver and a second transceiver of a mobile computing device including an antenna, including a combiner to allow the first transceiver and the second transceiver to share the antenna for simultaneous operation, and including an antenna switch to select one of the first transceiver and the second transceiver to exclusively use the antenna; and
generating a cancellation signal to cancel an interference signal for the radio-frequency coupling channel between the first transceiver and the second transceiver when the first transceiver is transmitting via the antenna.

11. The method of claim 10, further comprising:
receiving a transmit signal from the first transceiver;
modifying a phase of the transmit signal; and
generating an intermediate cancellation signal.

12. The method of claim 10, further comprising modifying a phase of a transmit signal from the first transceiver by approximately 180 degrees.

13. The method of claim 10, further comprising:
receiving an intermediate cancellation signal;
modifying an amount of gain for the intermediate cancellation signal; and
generating the cancellation signal.

14. The method of claim 10, further comprising generating control parameters for a phase delay element and a variable gain amplifier of an active signal canceller to generate the cancellation signal.

15. The method of claim 10, further comprising cancelling the interference signal by providing the cancellation signal to the second transceiver.

16. An article comprising a non-transitory storage medium containing instructions that, when executed by a processor of a system, cause the system to:
generate control parameters for a phase delay element and a variable gain amplifier of an active signal canceller; and
provide the control parameters to the phase delay element and the variable gain amplifier of the active signal canceller to generate a cancellation signal that cancels an interference signal for a radio-frequency coupling channel between a first transceiver and a second transceiver when the first transceiver is transmitting via an antenna and a combiner that allows the first transceiver and the second transceiver to share the antenna for simultaneous operation and a switch to select one of the first transceiver and the second transceiver to exclusively use the antenna.

17. The article of claim 16, wherein the instructions to generate the control parameters for the phase delay element of the active signal canceller comprise instructions that, when executed by the processor, cause the system to control an amount of phase delay applied to a transmit signal from the first transceiver to form an intermediate cancellation signal.

18. The article of claim 16, wherein the instructions to generate the control parameters for the variable gain amplifier of the active signal canceller comprise instructions that, when executed by the processor, cause the system to vary an amount of gain applied to an intermediate cancellation signal to form the cancellation signal.

19. The article of claim 16, further comprising instructions that, when executed by the processor, cause the system to retrieve the control parameters for the phase delay element and the variable gain amplifier of the active signal canceller from a memory unit.

* * * * *